Jan. 22, 1924.

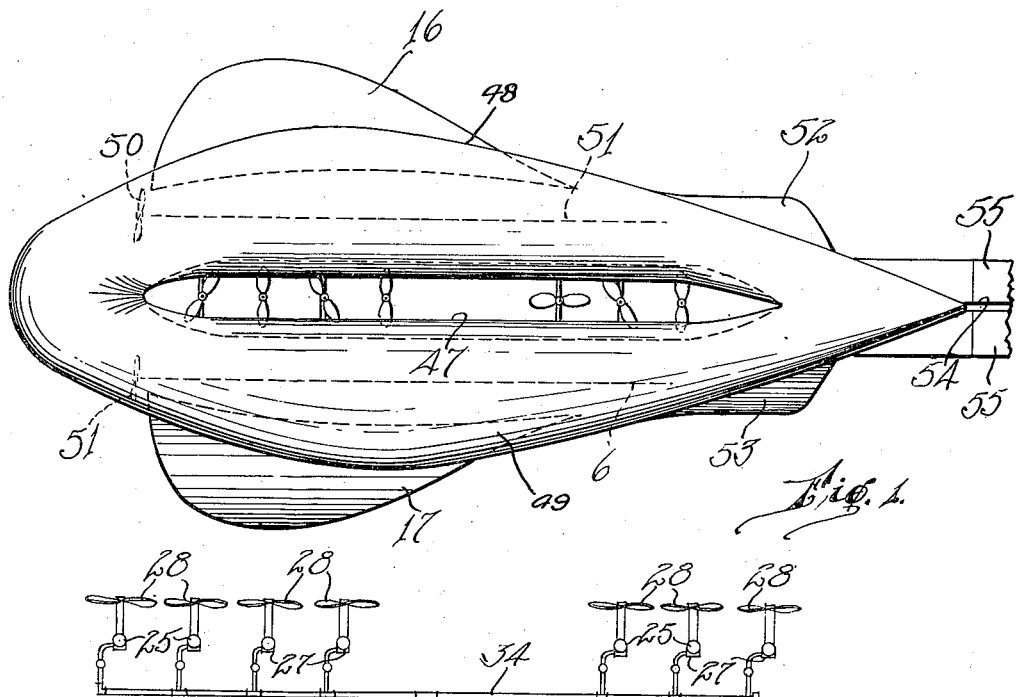
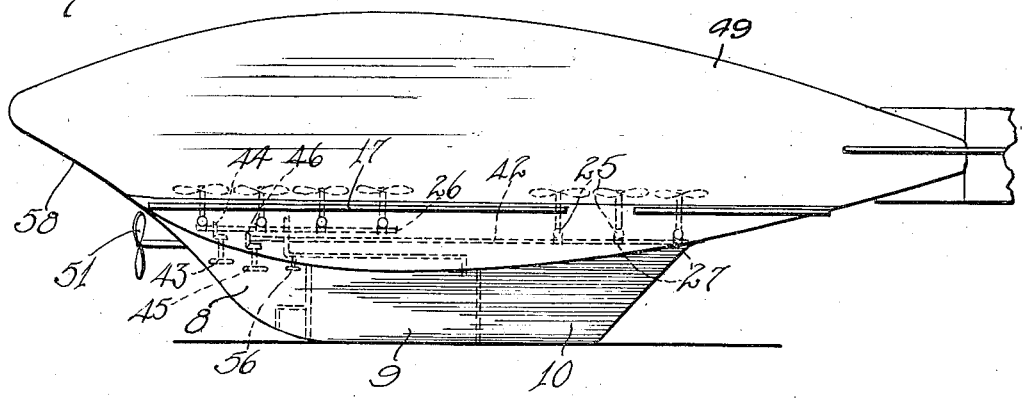

J. WHALEN

AIRCRAFT

Filed Nov. 16, 1922

INVENTOR
J. Whalen
BY
ATTORNEYS

Patented Jan. 22, 1924.

1,481,448

UNITED STATES PATENT OFFICE.

JAMES WHALEN, OF CHICAGO, ILLINOIS.

AIRCRAFT.

Application filed November 16, 1922. Serial No. 601,310.

*To all whom it may concern:*

Be it known that I, JAMES WHALEN, a citizen of the United States, and a resident of Chicago, in the county of Cook and State of Illinois, have invented a new and useful Improvement in Aircraft, of which the following is a full, clear, and exact description.

My invention relates to improvements in aircraft, and it consists in the combinations, constructions, and arrangements herein described and claimed.

An object of my invention is to provide an improvement over that form of the device shown in my Patent No. 1,332,787. In said prior patent I disclosed an aircraft having a gas bag with a central vertical opening therethrough. A plurality of propellers are disposed in the opening, and when actuated are adapted to lift the craft into the air. I also disclosed in the patented device a novel means for swinging the propellers in a vertical plane so as to help propel the aircraft forward. Wings and tractor propellers form the other instrumentalities for lifting and moving the aircraft while in the air. The present form of the device consists in two gas bags which are joined at one end to form a common bull-nose for the aircraft, and are also joined at the rear end to form a tail portion.

A further object of my invention is to provide a device of the character described in which the propellers are disposed adjacent to the under side of the aircraft whereby the aircraft will more readily keep its balance.

A further object of my invention is to provide a device of the type described which makes use of steam for actuating the propellers, whereby the fuel necessary to drive the craft will take up a relatively small space and will not weigh very much.

A further object of my invention is to provide a device of the type described in which the super-structure can be removed as a unit from the under-structure, the under-structure being so designed that it can be used as a water skimmer or flying boat.

A further object of my invention is to provide a device of the type described which has novel means for swinging the propellers in a vertical plane and for oiling the moving parts.

A further object of my invention is to provide a device of the type described which makes use of various instrumentalities for lifting and propelling the aircraft through the air, such as gas bags, wings, propellers, and tractor propellers, whereby the device may be sustained motionless in the air through an extended period of time.

A further object of my invention is to provide a device of the type described which is simple in construction, durable and efficient for the purpose intended, and which is not likely to easily get out of order.

Other objects and advantages will appear in the following specification, and the novel features of the invention will be particularly pointed out in the appended claims.

My invention is illustrated in the accompanying drawings forming part of this application in which—

Figure 1 is a plan view of the device,

Figure 2 is a side elevation of the device,

Figure 5 is a diagrammatic view of another portion of the device.

Figure 3:
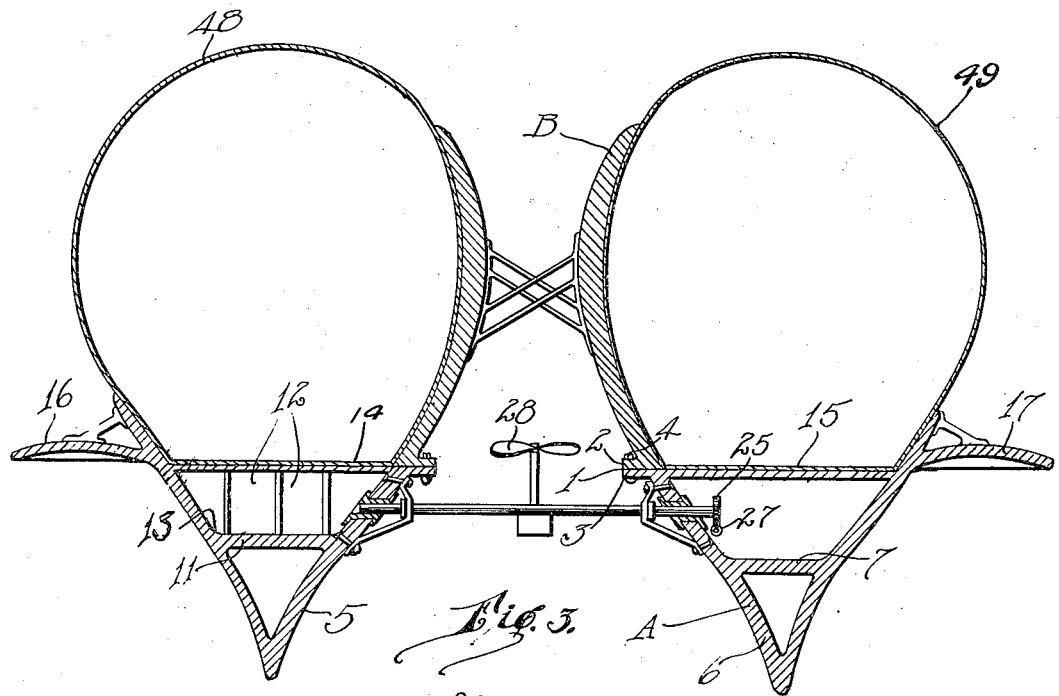
Figure 3 is a transverse section through the device.

In carrying out my invention I provide a framework which consists of the sections A and B, the section A being called the understructure and the section B, being called the super-structure. These two sections are removably secured to each other at 1. It will be noted from Figure 3 that the section B has flanges 2 and that section A has flanges 3, these flanges being secured to each other by bolts 4. The section A is rigid in construction, while the section B is of semi-rigid construction.

The section A is really composed of two keel-shaped bottoms 5 and 6 which are shaped in much the same manner as the ordinary keel of a boat. It will be noted that the under sides of the keels 5 and 6 are parallel with respect to each other and lie in the same plane, whereby they provide a broad supporting base for the craft when it lies on the ground and also provides the craft with two ordinary boat keels when it lies on the water. The keel 6 has a floor 7 therein and on this floor are disposed the pilot's cabin 8, the engine room 9, and the crew's quarters 10. The keel 5 has a floor 11 and carries the passengers' cabins 12. A promenade deck encircles the cabins 12 and transverse passages cut through the cabins at different intervals, so as to permit ready passage from the deck on one side of the keel 5 to the opposite. The space below the floors 7 and 11 is adapted to be used for storage or for ballast.

Figure 4:
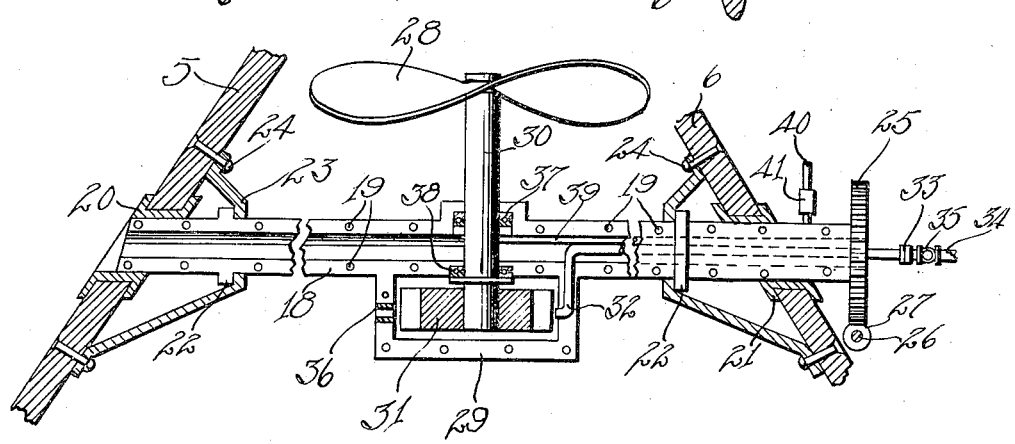
Figure 4 is an enlarged sectional view of a portion of the device.

The keels 5 and 6 are provided with upper floorings 14 and 15 and with wings 16 and 17. In Figure 4 I have shown a novel means for securing the keels 5 and 6 to each other, this means also supporting the propellers which are used for lifting the aircraft. This means comprises a tubular strut 18 which is composed of two sections secured together by means of bolts 19. The strut 18 is rotatably mounted in the sides of the keels 5 and 6 and is carried by bushings 20 and 21. It will be seen from this construction that the housing 18 may be rotated at will. Collars 22 are carried by the strut 18 and bear against brackets 23 which in turn are secured to the keels 5 and 6 by means of rivets 24 or the like. In this manner the strut 18 acts as a rigid brace between the two keels 5 and 6, and at the same time is permitted to rotate freely.

A portion of the strut 18 which is carried by the keel 6 projects into the keel and has a gear 25 rigidly secured thereto. A shaft 26 extends at right angles to the strut 18 and carries a worm gear 27 which engages with the gear 25, whereby rotation of the shaft 26 will also rotate the strut 18. In Figure 1 I have shown four of the struts 18 as being disposed adjacent to the forward end of the aircraft, and three of the struts 18 as being disposed adjacent to the rear end. It is obvious that this number may be changed at will.

Each of the struts 18 carries a propeller 28 and also carries the means which actuates the propeller. This structure is clearly shown in Figure 4 and comprises a turbine casing 29 which is carried by the strut 18 and which is concentrically disposed with respect to the strut. A shaft 30 of the propeller extends vertically with respect to the strut 18 and carries an impeller 31 at its lower end. A steam pipe 32 communicates with the casing 29 and projects from the end of the strut 18 which carries the gear 25. It will be noted that a portion of the pipe which projects from the end of the strut 18 is axially aligned with the strut whereby the exposed portion of the steam pipe will merely be rotated when the strut 18 is rotated. The pipe is provided with a union 33 which permits the pipe 32 to rotate with respect to the steam pipe 34. A valve 35 controls the passage of steam from the pipe 34 into the pipe 32. The casing 29 has an exhaust support 36. The propeller 28 is provided with the ordinary thrust bearings 37 and 38, whereby the lifting force of the propeller is transmitted directly to the strut, and not to the impeller. It will be noted from this construction that when the shaft 26 is rotated, it will rotate the strut 18 so as to swing the propeller 28 in a vertical plane. When the propeller is in a vertical position it will lift the aircraft vertically, but when at an angle so as to face forward or rearward, it will move the aircraft in a forward or rearward direction. In this manner the propellers are adapted to move the aircraft while in the air in addition to the lifting of the aircraft. The oil pipe 39 is disposed directly above the steam pipe 32 and terminates adjacent to the shaft 30, whereby the shaft 30 is provided with the required lubrication. Since the oil pipe 39 is disposed above the steam pipe 32, the oil will always be kept thin, so it will readily flow through the pipe. The pipe 39 communicates with an oil feed pipe 40 by means of a flexible pipe 41. This construction permits the strut 18 to rotate with respect to the pipe 40. As heretofore stated, there are four propellers 28 disposed in the forward part of the aircraft which are adapted to lift the aircraft and there are three propellers disposed adjacent to the rear end of the aircraft. These propellers are carried by struts 18 in the same manner as the aforementioned propeller 28 is secured to the strut 18. The rod 26 operatively connects the four forward propellers to each other and a rod 42 connects the three rearward propellers to each other. A hand wheel 43 is connected to the shaft 26 by means of beveled gears 44 and a hand wheel 45 is connected to the shaft 42 by means of gears 46. These hand wheels are disposed within the pilot's cabin 8, whereby they may be readily actuated by the pilot. It will be obvious from this construction that the forward propellers may be deflected at a different angle with respect to the rearward propellers so as to provide a greater or less lifting force for the forward end than the rearward end. In other words, if a greater weight is carried by the forward end of the aircraft, the forward propellers may be disposed in a more vertical position so as to provide a greater lifting force for the forward end, whereby the craft will be kept on an even keel.

It should be clearly noted that the propellers 28 are disposed adjacent to the lower side of the aircraft, whereby the aircraft is kept balanced and will not likely turn over when in the air. In my patented device I show the propellers as being disposed along the top of the aircraft. In this construction the center of gravity was disposed adjacent to the top of the aircraft and the top would more readily turn over, while in the air. The space 47 between the keels 5 and 6 is substantially the same width throughout its entire length, whereby all of the propellers will provide a uniform lifting force. The construction, as described so far is adapted to be used as a water skimmer or flying boat since the keels 5 and 6 will support the device and the propellers 28 when deflected will move the device in a horizontal path.

The super-structure B is adapted to house gas bags 48 and 49 which are removably secured to the super-structure. The bags 48 and 49 when inflated are adapted to carry most of the weight of the aircraft. The propellers 28 when actuated will therefore readily lift the craft to any height desired. When the craft has been lifted to this desired height the propellers 28 may be deflected at an angle so as to move the aircraft in a horizontal plane. It will now be observed that the wings 16 and 17 will carry a great portion of the load. These wings will therefore relieve the propellers 28 from a great weight which they were heretofore lifting and will thus permit the propellers to be used as a means for moving the aircraft in a horizontal plane. In addition to the propellers 28 I provide two tractor propellers 50 and 51 which are aligned with the keels 5 and 6 and which when actuated will move the aircraft in the same manner as the ordinary aeroplane propeller. Small glider wings 52 and 53 are disposed in the same plane as the wings 16 and 17 and are adapted to aid in the lifting of the aircraft when it is being moved through the air. The craft is provided with the ordinary rudder 54 and with the elevators 55.

From the foregoing description of the various parts of the device, the operation thereof may be readily understood. As heretofore stated the gas bags 48 and 49 are adapted to carry practically the entire weight of the aircraft and it will therefore be obvious that the propellers 28 will readily lift the craft from the ground. The weight in the keel 5 is balanced with the weight disposed within the keel 6 so that when the craft is up in the air it will not list but remain on even keel. It will be noted, however, that the craft will carry more weight in its forward end or rearward end, if desired, and still remain on an even keel. This is accomplished by means of deflecting the forward propellers or rearward propellers at different angles with respect to each other.

After the craft has been loaded with the desired weight the pilot opens the valve 56 which permits steam to pass from the steam pipe 57 into the pipe 34, which communicates with the pipe 33 as heretofore described. The pipe 57 connects with the steam boiler (not shown). The valves 35 are normally open so that when the valve 56 is open all of the propellers 28 will be actuated simultaneously. As soon as the propellers 28 are actuated they will lift the craft vertically from the ground. This operation is continued until the craft has attained the desired height, whereby the pilot can cause the craft to move in a horizontal plane by means of actuating the hand wheels 43 and 45 and starting the tractor propellers 50 and 51. The deflection of the propellers 28 and the rotation of the propellers 50 and 51 causes the craft to move in a horizontal plane. The wings 16, 17, 52, and 53 now support a great deal of the weight of the craft. In this manner the propellers 28 can be deflected still more, whereby the speed of the craft may be materially increased. It should be noted from Figure 2 that the front end of the bags 48 and 49 merge together in a single unit and are provided with an undersurface 58 which extends at an angle and which is adapted to lift the craft as it moves through the air. This construction provides another feature for lifting the craft as it moves through the air. It should be noted that the propellers 50 and 51 are aligned with the wings 16 and 17 and are disposed beneath wings 16 and 17 so that the draft created by the propellers will flow beneath the wings 16 and 17, 52 and 53, and will aid in lifting the craft as well as propelling it along a horizontal plane. The craft can be guided in its movement by means of the rudder 54 and the elevators 55.

It will be noted that the craft is constructed so that it can alight either upon the water or land, as desired. As heretofore stated the keels 5 and 6 lie in the same plane and therefore provide a wide base for supporting the aircraft when resting on the land. The keels also form a means for guiding the aircraft in the water and for supporting the aircraft upon the water. In case something happens to the super-structure the bolts 4 may be removed so as to release the super-structure from the under-structure whereby the device may be used as a skimmer upon the water. In this manner the device may be readily brought back to port in case of an accident.

As heretofore stated the device is simple in construction and makes use of all of the instrumentalities of lifting and propelling the craft while in the air.

I claim:

1. An aircraft comprising a frame having an under-structure and a super-structure removably secured to each other, said under-structure being composed of two keels disposed parallel with respect to each other and said super-structure having two gas bags, the bags combining to form a common bull nose at the front of the device and combining to form a common tail at the other end of the device.

2. In a device of the type described an under-structure consisting of two keel portions, hollow struts rotatably disposed between said keels, braces co-operating with said struts to rigidly hold said keels together, a shaft carried by each strut, a turbine secured to one end of said shaft, a propeller secured to the other end of said shaft, a steam pipe disposed in said strut and communicating with said turbine, an oil pipe disposed in said strut and contacting with said steam pipe, said oil pipe terminating adjacent to said shaft, and means for swinging said shaft.

3. An aircraft comprising two balloon-shaped bags merging at their front ends into a common bull nose and at their rear ends into a tail portion, thereby providing a vertical air space, two keels rigidly secured to each other and being removably secured to said bags, lifting propellers disposed in the space between the bags, laterally extending wings carried by said keels, tractor propellers disposed in front of said keels and below said wings, one of said keels being adapted to carry passengers while the other keel is provided with a pilot cabin, crews' quarters, and engine room, and means manually controlled from said pilot cabin for swinging said first named propellers in a vertical plane.

4. In an aircraft construction, an under-structure consisting of two keel portions, struts rotatably disposed between said keels, steam turbines carried by said struts, and means for swinging said struts.

5. In an aircraft construction, an under-structure consisting of two keel portions, struts rotatably disposed between said keels, steam turbines carried by said struts, a steam pipe disposed in each strut and communicating with each turbine, and means for swinging said struts.

6. An aircraft construction comprising a rigid under-structure and a semi-rigid super-structure removably secured to said under-structure, said super-structure consisting of a rigid frame having two protecting plates spaced from each other, and a balloon partially enclosed by said plates.

JAMES WHALEN.